United States Patent
MacMurray

[11] 3,756,072
[45] Sept. 4, 1973

[54] PORTABLE LEAK TEST INSTRUMENT

[75] Inventor: James G. MacMurray, Norwalk, Ohio

[73] Assignee: Youngstown-Miller Corporation, Norwalk, Ohio

[22] Filed: Dec. 27, 1971

[21] Appl. No.: 212,191

[52] U.S. Cl. .................................. 73/40.5, 73/49.1
[51] Int. Cl. ........................................... G01m 3/08
[58] Field of Search...................... 73/40.5, 39, 49.1, 73/40.7, 119 R, 388 R

[56] References Cited
UNITED STATES PATENTS
| | | | |
|---|---|---|---|
| 2,051,042 | 8/1936 | Hendel et al.................. | 73/388 R X |
| 2,212,466 | 8/1940 | Bradford.......................... | 73/47 |
| 2,625,033 | 1/1953 | Adair............................. | 73/119 R X |
| 2,645,128 | 7/1953 | Walker et al. .................. | 73/388 R |
| 2,727,383 | 12/1955 | Ross et al. ........................... | 73/40.7 |
| 3,012,433 | 12/1961 | Blafield............................ | 73/40.5 R |
| 3,184,958 | 5/1965 | Eaton................................ | 73/40.5 R |

Primary Examiner—Louis J. Capozi
Attorney—Carl F. Schaffer, Vincent L. Barker, Jr. et al.

[57] ABSTRACT

A portable leak test instrument for fluid lines, pressure vessels and other fluid tight systems and enclosures. The instrument has a tank containing a quantity of inert gas under predetermined greater than atmospheric pressure. In order to perform a test, the tank is connected through a pre-set pressure regulator to a first pressure indicating gauge and a line which is adapted to be coupled to the closed system to be tested. The line has a shut-off valve located between the first gauge and the coupling. A second pressure indicating gauge is connected to the line between the shut-off valve and the coupling.

3 Claims, 2 Drawing Figures

Patented Sept. 4, 1973
3,756,072
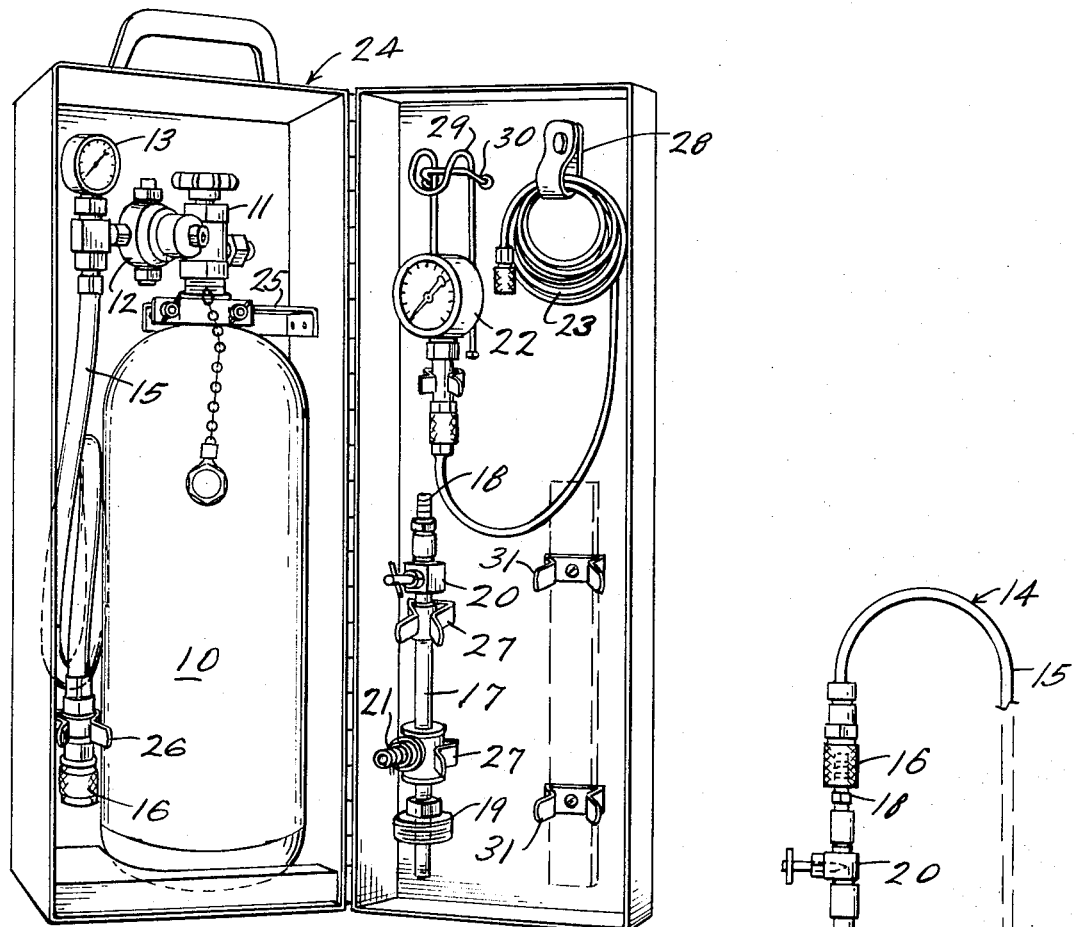
FIG-1-
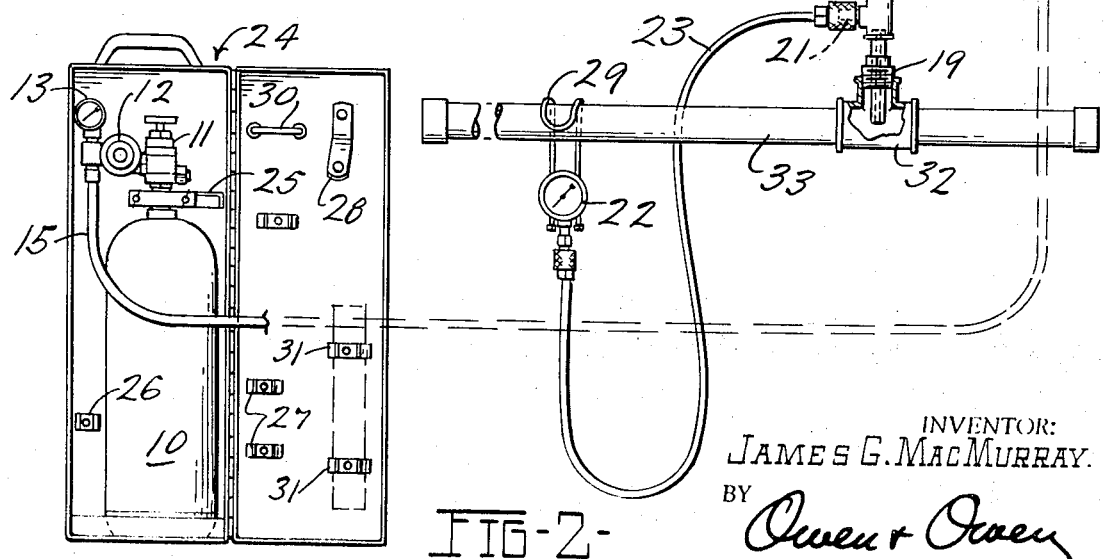
FIG-2-
INVENTOR:
JAMES G. MACMURRAY.
BY
Owen & Owen
ATT'YS.

PORTABLE LEAK TEST INSTRUMENT

BACKGROUND OF THE INVENTION

One of the most frequent problems encountered by municipal fuel gas companies is the detection of leaks in lines leading from mains to residences, buildings, and factories. These lines usually are buried beneath the surface of the ground, particularly in residential areas. Leaks usually are not detected until they become bad enough so that the odor of the gas is apparent to passersby or residents. A simple and convenient method of testing such lines from time to time appears to be desirable so that the regular maintenance personnel of the fuel gas company may check the condition of any line as desired without actually examining the line.

It is therefore the principal object of the instant invention to provide a portable leak test instrument so designed as to enable the testing of fluid lines, fluid containers, and other fluid systems such as pressure vessels, or the like, quickly and easily with immediate and positive indication of whether or not a leak exists in the line, vessel, or system.

It is yet another object of the instant invention to provide a portable leak test instrument which is self-contained in its own carrying case with its major components ready for quick and easy assembly into testing relationship and equally readily disassemblable after a test for storage in the case.

BRIEF DESCRIPTION OF THE DRAWINGS

FIG. 1 is a view in perspective of a portable leak test instrument embodying the instant invention as mounted in its portable carrying case with its major components dissassembled for ease of portability yet ready for assembly into testing relationship; and FIG. 2 is a somewhat diagrammatic view, disregarding proportions, and showing the leak test instrument in leak testing arrangement, the instrument being illustrated as it would be employed for testing a gas line such as that leading into a residence.

DESCRIPTION OF PREFERRED EMBODIMENT

A portable leak test instrument embodying the invention comprises a number of component parts which may generally be grouped into three major sub-assemblies. The three major subassemblies are: (1) a pressure tank 10 with shut-off valve 11, pressure regulator 12 and pressure indicating gauge 13; (2) a coupling line generally indicated by the reference number 14 and consisting of two sections, viz., a hose 15 with a quick disconnect coupling 16 and a second section comprising a length of pipe or tubing 17 having at one end a quick disconnect adapter 18 and a connector 19 at the other end, this second portion also including a shut-off valve 20 intermediate its ends and a nipple 21 located between the valve 20 and the connector 19; and (3) a line status pressure gauge 22 with its connecting line 23.

As is illustrated in FIG. 1, the portable leak test instrument is so designed and arranged that it can readily be carried in a carrying case indicated by the reference number 24. The first major sub-assembly comprising the tank 10, shut-off valve 11, pressure regulator 12, and gauge 13 with the first section 15 of the coupling line 14 is permanently mounted within the case 24. A suitable bracket 25 and mounting clip 26 retain these structures within the case 24. The second portion of the coupling line 14 comprising the pipe 17 with its adpater 18, connector 19, shut-off valve 20 and nipple 21, is removably retained in the cover of the case 24 by mounting clips 27. Similarly the line status pressure gauge 22 and its connecting line 23 are removably retained in the case 24 by a fastening strap 28 and the engagement of a hanger 29 for the gauge 22 in a support 30. Additional mounting clips 31 may also be provided in the cover of the case 24 for carrying a portable manometer (not shown) or other device or accessory not necessary to nor comprising an operating part of the instant invention, such as a wrench.

When an inspector makes a call to test a fluid or gas line, pressure vessel or tank or other enclosure, he brings with him the case 24 containing the various components and sub-assemblies of the invention. In the illustrated embodiment of the invention, the connector 19 is designed for rapid connection into a conventional Tee generally indicated by the reference number 32 which is present, for example, in a portion of a domestic gas line generally indicated by the reference number 33. Of course, as will be appreciated, the leak test instrument of the instant invention or an inspector utilizing the device would also include or have available additional connectors to replace the connector 19 or to be added thereto for the purpose of coupling the leak test instrument into other connecting means in pressure vessels, enclosures, tanks, etc. Because of the high degree of standarization of fittings and couplings in this art, a relatively small number of substitute connectors or adapters would enable the utilization of a portable leak test instrument embodying the invention for testing various fluid or gas pipes.

Before proceeding to test the line or vessel, the inspector may wish to test the instrument itself to determine whether or not it is in full test condition. In order to effect this initial test, he opens the main shut-off valve 11 which allows the gas in the tank 10 to flow through the pressure regulator 12 and into the hose 15. In most instances, a portable test instrument embodying the invention is supplied with a sufficient quantity of carbon dioxide under pressure in the tank 10 so as to create a pressure through the regulator 12 at a set level of approximately 90 psig. In addition, the quick disconnect coupling 16 is of the well known type which closes automatically and remains closed against internal pressure until the adapter 18 is inserted into the coupling 16. As a result, when the inspector opens the valve 11, gas flows through the pressure regulator 12 and fills the hose 15 energizing the gauge 13 to indicate the line test pressure, for example, approximately 90 psig. If this initial test shows that the instrument is in proper operating condition, the inspector then proceeds with the following steps to make the actual line test.

He first removes the second length or portion of the coupling line 14 comprising the pipe 17 with its integral devices and makes sure that the valve 20 is closed. He then inserts the adapter 18 into the quick disconnect coupling 16 which opens the coupling 16 and pressurizes the coupling line up to the valve 20. If the gauge 13 continues to register the same pressure, he is certain that this connection has been made and that the valve 20 is closed. As a next step, he may disconnect the adapter 18 and coupling 16 so as to permit him to insert the connector 19 into the Tee 32 or to similarly establish a connection with the line to be tested by the use of other connectors or adapters. He then attaches the line status gauge 22 to the nipple 21 through its connecting line 23 and hangs the gauge 22 in a convenient place as illustrated in FIG. 2. At this point in the test he can read the line pressure in the line 33, for example, the low pressure conventional in such lines or, if desirable, he may connect an accessory instrument such as a manometer recording a low pressure in inches of water to the nipple 21 in place of the test indicating gauge 22. After this assembly has been completed, he reinserts the adapter 18 into the quick disconnect coupling 16 and the instrument is now connected for testing.

The first step in making the test is to open the valve 20. This pressurizes the entire test instrument including the status gauge 22 and also the line 33, for example from the residence to the "main" at the street. Of course, as one familiar with the situation would realize, the inspector has first shut off the main valve where the residence line leaves the main so that it is the residence feeding line only which is being tested.

The inspector leaves the valve 20 open for a period of several minutes while watching the status gauge 22. Because of the high pressure of 90 psig. delivered to the test instrument and through the test instrument to the line 33 being tested, even if there is a leak in that line, the gauge 22 will rapidly rise to test level and will steady at that point as long as the valve 20 is kept open, unless, of course, the leak is massive. As soon as the gauge 22 reaches approximately 90 psig., the inspector closes the valve 20 to isolate the pressure tank 10 from the line 33 being tested. He then watches the pressure gauge 22. If the gauge 22 remains at the test pressure, it is a clear and definite indication that the line 33 is not leaking. If, on the other hand, the line status gauge 22 drops from the test pressure, it is a clear indication that the line 33 between the test point at the Tee 32, and the main is leaking.

If the fluid or gas containing structure, i.e., a pressure vessel, fluid line in a factory or business estabilshment has a substantially greater volume than is expected in a residential feed line, the test proceeds in the same fashion because the cylinder 10 with a reasonable charge of carbon dioxide, say ten pounds liquid by weight, is capable of displacing some 8.5 cubic feet per pound or a total of 85 cubic feet at an atmospheric pressure of 68° F. If the system to be tested has a larger volume, an instrument embodying the invention would be provided with a tank 10 of larger capacity, perhaps mounted on a separate carrying dolly. However, in most instances, particularly in the testing of fuel gas lines to residences and even to office buildings and factories, the feeding lines are so arranged and designed to permit the isolation of lengths or sections thereof by the closing and opening of successive valves in the system so that a portable test instrument embodying the invention with a tank 10 containing only 10 pounds of carbon dioxide liquid is adequate for the majority of tests.

For safety purposes, as in most pressurized systems, the body of the main shut-off valve 11 or the pressure regulator 12, is provided with a safety pop-off valve which will be opened to relieve the pressure in the instrument and in the line under test if, for some reason, the calibration of the regulator 12 is improper or some damage has occurred in some other part of the instrument.

The status gauge 22 preferably has a red maximum pressure hand which rises with the ordinary pointer to the maximum line pressure. If a leak is present, the ordinary pointer falls back away from the red hand and the leak is thus indicated within a matter of a few seconds.

It will also be realized, of course, that if a line of great length is being tested, more than a few seconds will be required to place the entire line under pressure in the initial charging of the system prior to closing the valve 20. However with 85 cubic feet of displacement available from a mere 10 pounds of carbon dioxide liquid, conventional gas lines up to a length of say, a mile or so, readily can be tested by an instrument embodying the invention in its simple portable embodiment described above.

Having described my invention I claim:

1. A leak test instrument for a closed fluid system, said instrument comprising, in combination,
   a tank containing a quantity of inert gas under greater than atmospheric pressure and including a shut-off valve thereon,
   a pressure regulator,
   a line connecting said shut-off valve to said pressure regulator,
   a pressure indicating gauge,
   a line connecting said pressure regulator to said gauge,
   a flexible length of coupling line leading from said gauge and terminating in a quick disconnect shut-off coupling,
   a line status gauging means,
   a second length of coupling line comprising a length of tubing having a quick disconnect adapter on one end, a connector adapted to be connected to the system to be tested at the other end, a shut-off valve located intermediate such ends, and means for connecting the line status gauging means intermediate the shut-off valve and the connector.

2. A leak test instrument according to claim 1 in which
   the tank, the pressure regulator and the first pressure indicating gauge are normally connected to each other and to the flexible length of coupling line,
   the second length of coupling line is detachable therefrom at the quick disconnect coupling,
   the line status gauging means comprises a pressure indicating gauge, a hanger means attached to the gauge for hanging the gauge on the system to be tested, whereby the gauge may be easily observed, and a length of flexible tubing leading from the gauge and terminating in a quick-disconnect coupling,
   and the connecting means in the second length of coupling line comprises a quick-disconnect adapter,
   whereby the test instrument readily may be connected in testing relationship and disconnected for storage and portability.

3. A leak test instrument according to claim 2 in which the inert gas is carbon dioxide.

* * * * *